United States Patent
Onishi et al.

(10) Patent No.: US 8,404,383 B2
(45) Date of Patent: Mar. 26, 2013

(54) NEGATIVE ELECTRODE MATERIAL FOR NONAQUEOUS SECONDARY CELLS, NEGATIVE ELECTRODE FOR NONAQUEOUS SECONDARY CELLS, AND NONAQUEOUS SECONDARY CELL

(75) Inventors: Nobuyuki Onishi, Sakaide (JP); Hideharu Satoh, Inashiki-gun (JP); Keita Yamaguchi, Inashiki-gun (JP)

(73) Assignees: Mitsubishi Chemical Corporation, Tokyo (JP); Tokai Carbon Co., Ltd., Tokyo (JP)

( * ) Notice: Subject to any disclaimer, the term of this patent is extended or adjusted under 35 U.S.C. 154(b) by 1090 days.

(21) Appl. No.: 11/661,213

(22) PCT Filed: Aug. 30, 2005

(86) PCT No.: PCT/JP2005/015754
§ 371 (c)(1),
(2), (4) Date: Dec. 19, 2007

(87) PCT Pub. No.: WO2006/025376
PCT Pub. Date: Mar. 9, 2006

(65) Prior Publication Data
US 2008/0199777 A1    Aug. 21, 2008

(30) Foreign Application Priority Data
Aug. 30, 2004 (JP) .................. 2004-250415

(51) Int. Cl.
*H01M 4/13* (2010.01)
*C01B 31/04* (2006.01)

(52) U.S. Cl. .................... 429/231.8; 423/448

(58) Field of Classification Search ............ 429/231.8; 423/448
See application file for complete search history.

(56) References Cited

U.S. PATENT DOCUMENTS
2004/0013942 A1  1/2004  Fukumoto et al.
2004/0023115 A1  2/2004  Kato et al.

FOREIGN PATENT DOCUMENTS

| | | |
|---|---|---|
| EP | 0 903 799 A2 | 3/1999 |
| EP | 0 903 799 A3 | 3/1999 |
| EP | 1 775 785 A1 | 4/2007 |
| JP | 10-188959 | 7/1998 |
| JP | 10-330107 | 12/1998 |
| JP | 11 154513 | * 6/1999 |
| JP | 11-154513 | 6/1999 |
| JP | 11-154513 | * 8/1999 |
| JP | 3091944 | 7/2000 |
| JP | 2004/127913 | 4/2004 |
| JP | 2004 127913 | * 4/2004 |
| JP | 2004-127913 | * 4/2004 |

OTHER PUBLICATIONS

U.S. Appl. No. 11/574,423, filed Feb. 28, 2007, Onishi, et al.
U.S. Appl. No. 12/521,372, filed Jun. 26, 2009, Matsumoto, et al.
Japanese Office Action mailed May 10, 2011, in JP 2006-532714, filed Dec. 25, 2006.

* cited by examiner

*Primary Examiner* — Melvin C Mayes
*Assistant Examiner* — Bijay Saha
(74) *Attorney, Agent, or Firm* — Oblon, Spivak, McClelland, Maier & Neustadt, L.L.P.

(57) ABSTRACT

A negative electrode material for a nonaqueous secondary battery capable of realizing a nonaqueous secondary battery having a small charging/discharging irreversible capacity at an initial cycle and exhibiting an excellent high-rate charging/discharging characteristics and an excellent cycle performances is provided. The main component of the material is graphite particles. The median diameter is 5 μm or more, and 40 μm or less in the volume-basis particle size distribution based on the laser diffraction/scattering particle size distribution measurement. The tapping density is 0.7 g/cm$^3$ or more. The specific surface area measured by a BET method is 0.2 m$^2$/g or more, and 8 m$^2$/g or less. The average circularity is 0.83 or more, and 1.00 or less. When an electrode is produced by a predetermined method for manufacturing an electrode and, the resulting electrode is subjected to X-ray diffraction, the graphite crystal orientation ratio $I_{110}/I_{004}$ on the electrode is 0.08 or more, where $I_{110}$ represents the wide angle X-ray diffraction peak area of the (110) peak peak in the region of $2\theta=76.5$ to 78.5 degrees of the graphite particles on the electrode and $I_{004}$ represents the wide angle X-ray diffraction peak area of the (004) peak peak in the region of $2\theta=53.5$ to 56 degrees.

16 Claims, No Drawings

NEGATIVE ELECTRODE MATERIAL FOR NONAQUEOUS SECONDARY CELLS, NEGATIVE ELECTRODE FOR NONAQUEOUS SECONDARY CELLS, AND NONAQUEOUS SECONDARY CELL

CROSS REFERENCE TO RELATED APPLICATION

This application is a 371 of PCT/JP05/015754, filed on Aug. 30, 2005, and claims priority to Japanese Patent Application No. 2004-250415, filed on Aug. 30, 2004.

TECHNICAL FIELD

The present invention relates to a negative electrode material to be used for a nonaqueous secondary battery, a negative electrode including this negative electrode material, and a nonaqueous secondary battery including this negative electrode.

BACKGROUND ART

In recent years, as electronic apparatuses have been miniaturized, demands for high-capacity secondary batteries have been increased. In particular, nonaqueous secondary batteries exhibiting a higher energy density as compared with those of nickel-cadmium cells and nickel metal-hydride batteries have been noted. Heretofore, metals, graphite, and the like have been studied as negative electrode active materials of nonaqueous secondary batteries. However, metal electrodes have problems in that when charge and discharge are repeated, lithium is deposited on electrodes dendritically and, finally, two electrodes are short-circuited. Therefore, carbon materials, in particular, graphite, have been noted because no lithium metal is deposited in a charge and discharge process.

However, there are problems in that since graphite is a flat crystal, graphite tends to be oriented parallel to the current collector in the electrode and, thereby, a high-rate charging/discharging characteristics tends to deteriorate; and since the expansion of the electrode in the charging/discharging cycle is significant, a cycle performances tends to deteriorate.

According to the description in Japanese Unexamined Patent Application Publication No. 10-188959, graphite granulated particles, in which a plurality of graphite particles are bonded in such a way that the oriented faces become not parallel to each other, are used and, thereby, expansion in a thickness direction of the electrode is suppressed and the high-rate charging/discharging characteristics and the cycle performances are improved.

However, the graphite granulated particles described in this patent document have problems in that the performance as a negative electrode material for a lithium ion secondary battery, in particular, a reduction of the irreversible capacity and an improvement of the high-rate charging/discharging characteristics are not always adequate and the cycle performances is also inadequate. The cause of these problems is not certain, but it is believed that the improvement of the electrode orientation ratio of the graphite granulated particles described in the above-described patent document is not always adequate.

According to the description in Japanese Unexamined Patent Application Publication No. 11-263612, natural flake graphite particles are modified into conglobated particles, which are made close to spherical particles and are allowed to have a specific circularity, appearance, and peak intensity ratio, and thereby, good operability is exhibited in slurrying and the applicability and the binding property in preparation of an electrode by application to copper foil or the like are improved.

In this technology described in Japanese Unexamined Patent Application Publication No. 11-263612 as well, the improvement effect thereof is not adequate. The reason for this is believed that the electrode orientation ratio is not improved adequately.

DISCLOSURE OF INVENTION

It is an object of the present invention to provide a negative electrode material formed from graphite particles having these performances improved. It is a further object of the present invention to provide a negative electrode for a nonaqueous secondary battery and a nonaqueous secondary battery including this negative electrode.

In a negative electrode material for a nonaqueous secondary battery according to an aspect of the present invention, the main component is graphite particles.

The median diameter of the graphite particles is 5 µm or more, and 40 µm or less in the volume-basis particle size distribution based on the laser diffraction/scattering particle size distribution measurement.

The tapping density of this negative electrode material is 0.7 g/cm$^3$ or more, and the specific surface area measured by a BET method is 0.2 m$^2$/g or more, and 8 m$^2$/g or less. The average circularity of the graphite particles is 0.83 or more, and 1.00 or less.

When an electrode is prepared by the following method for manufacturing an electrode and the resulting electrode is subjected to X-ray diffraction, the graphite crystal orientation ratio $I_{110}/I_{004}$ on the electrode is 0.08 or more, where $I_{110}$ represents the wide angle X-ray diffraction peak area of the (110) peak in the region of 2θ=76.5 to 78.5 degrees of the graphite particles on the electrode and $I_{004}$ represents the wide angle X-ray diffraction peak area of the (004) peak in the region of 2θ=53.5 to 56 degrees.

[Method for Manufacturing Electrode]

A slurry having a solid concentration of 50% is prepared by adding 1 part by weight of aqueous dispersion of styrene-butadiene rubber in terms of solid content and 1 part by weight of carboxymethyl cellulose (molecular weight 250,000 to 300,000) aqueous solution in terms of solid content to 100 parts by weight of the above-described negative electrode material, the resulting slurry is applied to a current collector formed from copper foil having a thickness of 18 µm by using a doctor blade in such a way that 10±0.1 mg/cm$^2$ of the negative electrode material in terms of weight after drying is adhered, followed by drying, and consolidation is performed by pressing once with a roll press (calender) while a press load is adjusted in such a way that the electrode density (exclusive of the copper foil) becomes 1.63±0.03 g/cm$^3$.

Hereafter, this method for manufacturing an electrode may be referred to as "a predetermined method for manufacturing an electrode". An electrode prepared by this predetermined method for manufacturing an electrode may be referred to as "a predetermined electrode of the present invention".

When a negative electrode material for a nonaqueous secondary battery according to an aspect of the present invention (hereafter may be referred to as "a negative electrode material of the present invention") is used, a negative electrode for a nonaqueous secondary battery having a small charging/discharging irreversible capacity at an initial cycle and exhibiting an excellent high-rate charging/discharging characteristics and an excellent cycle performances and a nonaqueous secondary battery including this negative electrode are provided.

DETAILED DESCRIPTION OF THE PREFERRED EMBODIMENTS

The preferred embodiments of the present invention will be described below in detail. However, the following description is an example of the present invention, and the present invention is not limited to the contents thereof within the gist of the invention.

[1] Negative Electrode Material for Nonaqueous Secondary Battery (1) Graphite Particles in Negative Electrode Material The main component of the negative electrode material of the present invention is graphite particles. In these graphite particles, usually, it is preferable that carbonaceous particles are bonded by and/or covered with a heat-treated binder which can be graphitized.

Examples of carbonaceous particles constituting the graphite particles include natural graphite, artificial graphite, a coke powder, a needle coke powder, and a carbonaceous powder, e.g., a powder of carbonized resin, which can be graphitized by firing. Among them, it is particularly preferable that a carbonaceous powder, e.g., a powder of carbonized resin, which can be graphitized by firing or natural graphite is used in the present invention.

It is essential only that the binder is carbonaceous and graphitizable, and preferably, petroleum based and coal based condensed polycyclic aromatics, from soft pitch to hard pitch, are used.

Graphite granulated particles are characterized in that the oriented faces are not parallel to each other, because carbonaceous particles, which are primary particles, are bonded by a graphitized carbonaceous material derived from a binder in such a way that the crystalline directions are oriented at random in the microstructure.

In the process in which the graphite particles are prepared by a manufacturing method described below, usually, bonding of a plurality of carbonaceous particles by a binder, that is, granulation, does not perfectly proceed. Therefore, particles, e.g., layered structure particles, each of which is no more than a single carbonaceous particle covered with the binder, and particles, which are no more than produced by carbonization or graphitization of the binder itself without containing carbonaceous particles, are also generated in addition to the graphite particles.

(2) Properties of Negative Electrode Material Median Diameter

The lower limit of the median diameter of the graphite particles constituting the negative electrode material of the present invention is 5 μm or more, preferably is 8 μm or more, and further preferably is 10 μm or more in the volume-basis particle size distribution based on the laser diffraction/scattering particle size distribution measurement. If the median diameter is too small, the specific surface area is increased, and the strength of the resulting electrode tends to become low. In pulverization to such a diameter, the time required for the pulverization is increased and, therefore, there is no economy.

The upper limit of the median diameter of the graphite particles is 40 μm or less, preferably is 35 μm or less, and further preferably is 30 μm or less. If the median diameter exceeds this upper limit, when the graphite particles are used as the negative electrode material, the unevenness occurs on the electrode surface, and a separator used in the cell tends to be damaged.

In the present invention, the volume-basis particle size distribution based on the laser diffraction/scattering particle size distribution measurement is measured by the following method.

<Method for Measuring Volume-Basis Particle Size Distribution>

A negative electrode material is suspended in 10 ml of 0.2-percent by weight aqueous solution of surfactant (polyoxyethylene sorbitan monolaurate, for example, Tween 20 (registered trade mark)). The suspension is introduced into a commercially available laser diffraction/scattering particle size distribution measurement apparatus. An ultrasonic wave of 28 kHz is applied at an output of 60 W for 1 minute and, thereafter, a measurement is performed.

Tapping Density

The tapping density of the negative electrode material of the present invention is 0.70 g/cm³ or more. It is more preferable that the tapping density is 0.75 g/cm³ or more, furthermore 0.80 g/cm³ or more, and particularly 0.9 g/cm³ or more. The upper limit of the tapping density is usually 1.3 g/cm³ or less.

If the tapping density is too low, the slurry concentration of the negative electrode material to be applied to a current collector must be reduced in the preparation of the negative electrode. Consequently, the density of a coating film is decreased and graphite particles tend to be broken when being pressed, so that the cell performance deteriorates. On the contrary, a high tapping density is preferable for the cell performance. However, further step is required for adjusting the shape and the particle size distribution of the graphite particles, so that the yield may be decreased and the cost may be increased.

In the present invention, the tapping density is measured by the following method.

<Method for Measuring Tapping Density>

A powder density measuring apparatus ("TAP DENSER KYT-4000" produced by Seishin Enterprise Co., Ltd.) is used. The negative electrode material is dropped into a 20-cm³ cylindrical tap cell through a sieve with an opening of 300 μm until the cell becomes full of the negative electrode material. Thereafter, tapping with a stroke length of 10 mm was performed 1,000 times, and the tapping density at that time is measured.

Specific Surface Area Based on BET Method

The specific surface area, which is measured by a BET method, of the negative electrode material of the present invention is usually 0.2 m²/g or more, and preferably is 0.3 m²/g or more. The upper limit thereof is usually 8 m²/g or less, preferably 6 m²/g or less, and particularly preferably 4 m²/g or less. If the value of the specific surface area is smaller than this range, the output characteristic tends to deteriorate. If the value of the specific surface area exceeds this range, the initial irreversible capacity is increased and the cycle performances tends to deteriorate.

In the present invention, the specific surface area is measured by the following method, for example.

<Method for Measuring Specific Surface Area>

A specific surface area measuring apparatus "AMS8000" produced by OHKURA RIKEN CO., LTD., is used, and the measurement is performed by a BET one point method based on a flow method through the use of nitrogen gas absorption. Specifically, about 0.4 g of sample (negative electrode material) is filled in a cell, and pretreatment is performed by heating up to 350° C. Thereafter, cooling to a liquid nitrogen temperature is performed so that a gas composed of 30% of nitrogen and 70% of He is adsorbed to saturation. Subsequently, heating is performed up to room temperature, the amount of desorbed gas is measured, and the specific surface area is calculated from the obtained results by a common BET method.

Average Circularity

The average circularity (circumferential length of equivalent circle/diameter of circle having projected area of particle) of the negative electrode material of the present invention is within the range of 0.83 or more, preferably 0.90 or more, and 1.00 or less, preferably 0.96 or less. If the average circularity is lower than this range, gaps between particles become small, and the load characteristic may deteriorates. On the other hand, in order to allow the value of the average circularity to exceed this range, a conglobation treatment must be performed intensely or for a long time, so that many fine powders, which are by-products of conglobation, must be removed. Therefore, it is not preferable because the manufacturing cost is increased.

For example, a flow particle image analyzer (for example, "FPIA" produced by Sysmex Industrial) is used, 0.2 g of measuring object (negative electrode material) is mixed into 0.2-percent by volume aqueous solution (about 50 ml) of polyoxyethylene (20) sorbitan monolaurate serving as a surfactant, and an ultrasonic wave of 28 kHz is applied for 1 minute at an output of 60 W. Thereafter, the detection range is specified to be 0.6 to 400 µm, particles within the range of 10 to 40 µm are measured, and the resulting values can be used as the average circularity.

The flow particle image analyzer performs image analysis of the result from direct image pickup of the particle image and, therefore, the total number of particles per unit weight, the distribution of the number of particles on the basis of the equivalent circle diameter (diameter of circle having the same projected area as that of particle pickup image), the average circularity (circumferential length of equivalent circle/circumferential length of particle projected image) distribution, and the like can be measured.

Graphite Crystal Orientation Ratio on Electrode

With respect to the predetermined electrode of the present invention prepared by the above-described predetermined method for manufacturing an electrode by using the negative electrode material of the present invention, it is preferable that the graphite crystal orientation ratio $I_{110}/I_{004}$ on the electrode, measured by the following method, is within the range of usually 0.08 or more, most of all 0.09 or more, and furthermore 0.10 or more, and usually 0.20 or less, most of all 0.18 or less, and furthermore 0.16 or less. If the orientation ratio $I_{110}/I_{004}$ is lower than the above-described range, when a cell is prepared, the electrode expansion during charging of the cell is increased, the cell capacity per unit volume of the electrode is hard to be increased, and furthermore, the cycle performances tends to deteriorate due to, for example, falling out of active material resulting from expansion and shrinkage during a cycle test. On the other hand, if the orientation ratio $I_{110}/I_{004}$ exceeds the above-described range, it becomes difficult to increase the filling density of the electrode after pressing.

Here, the graphite crystal orientation ratio $I_{110}/I_{004}$ on the electrode is an index representing the degree of orientation of the graphite crystal hexagonal network in the thickness direction of the electrode. As the orientation ratio $I_{110}/I_{004}$ is increased, the state, in which the directions of graphite crystal hexagonal networks of particles are not aligned, is indicated.

<Method for Measuring Graphite Crystal Orientation Ratio on the Electrode>

With respect to the predetermined electrode of the present invention, a chart of the (110) face and the (004) face of graphite on the electrode is obtained by X-ray diffraction. With respect to the resulting chart, peak separation is performed by fitting through the use of asymmetric Pearson VII as the profile function, and the integrated intensities of the peaks of the (110) face and the (004) face are calculated. A ratio represented by (110) face integral intensity/(004) face integral intensity is calculated from the resulting integrated intensities, and the ratio is defined as a graphite crystal orientation ratio on the electrode.

Here, the X-ray diffraction measurement conditions are as described below, where "2θ" represents a diffraction angle.

Target: Cu(Kα ray) graphite monochromator

Slit: divergence slit=1 degree, light receiving slit=0.1 mm, scattering slit=1 degree Measurement range, and step angle/measurement time:
(110) face: 76.5 degrees≦2θ≦78.5 degrees 0.01 degrees/3 seconds
(004) face: 53.5 degrees≦2θ≦56.0 degrees 0.01 degrees/3 seconds Sample preparation: a predetermined electrode is fixed to a glass plate of 0.1 mm thickness with a double-faced tape Total Number With respect to the negative electrode material of the present invention, preferably, the total number of particles determined in number-basis equivalent circle diameter distribution measurement based on the above-described flow particle image analysis is usually $30 \times 10^6$/g or less, although not specifically limited. In general, a large total number of particles refers to that the amount of fine particles is large, and the initial charging/discharging irreversible capacity, the cycle performances of the cell, and the like tend to deteriorate. It is favorable that the total number of particles is minimized. However, it is usually $1 \times 10^6$/g or more from the view point of the cost and the operability.

$d_{90}/d_{10}$

With respect to the negative electrode material of the present invention, preferably, the ratio ($d_{90}/d_{10}$) of the particle size ($d_{90}$) at the cumulative volume fraction of 90% to the particle size ($d_{10}$) at the cumulative volume fraction of 10% is 5 or less in the particle size-basis volume distribution based on the laser diffraction/scattering particle size distribution measurement, although not specifically limited.

The $d_{90}/d_{10}$ represents the spreading of the particle size distribution, and as this ratio is decreased, the particle size distribution becomes narrow. In the present invention, preferably, the $d_{90}/d_{10}$ is 4 or less. With respect to the negative electrode material containing graphite particles as a main component, a large $d_{90}/d_{10}$ indicates that the particle size distribution is spread, and it is indicated that many fine particles and coarse particles are present, in particular, many fine particles are present. If many fine particles are present, the following problems occur:

(1) the specific surface area is increased and, thereby, the initial charging/discharging irreversible capacity is increased, (2) fine particles adsorbed by the binder for molding the electrode, the binder being added in preparation of the negative electrode, are filled in gaps between particles so as to block communicating holes serving as diffusion paths of lithium ions and, thereby, a high-rate charging/discharging characteristics deteriorates, and (3) an increase of the specific surface area and blocking of the communicating holes allow the cycle performances to further deteriorate. Usually, the lower limit of the $d_{90}/d_{10}$ is 2 or more from the view point of the operation to adjust the particle size distribution and the yield, although not specifically limited.

When the $d_{90}/d_{10}$ is within the above-described range, there are advantages that the effect of the binder for molding the electrode can be effectively exerted and the strength of the negative electrode can be improved. Furthermore, when coarse particles are reduced, it is possible to avoid the problem in that a separator used in a cell tends to be damaged due to an occurrence of unevenness on the electrode surface in the step of preparing the negative electrode by application of a slurry of the negative electrode material to the current collector.

A/B

With respect to the negative electrode material of the present invention, in the equivalent circle diameter distribution measurement based on the above-described flow particle image analysis, preferably, the ratio (A/B) of an average frequency (A) in the range from the smallest equivalent circle diameter up to cumulative frequency of 20%+/−5% to an average frequency (B) in the range from the smallest equivalent circle diameter up to cumulative frequency of 80%+/−5% is 1.2 to 8.0.

According to the study of the inventors of the present invention, with respect to the negative electrode material containing graphite particles as a main component, it has been made clear that particles in a small particle size portion, which have exerted almost no influence on the above-described particle size-basis cumulative volume distribution, have exerted influences on the initial charging/discharging irreversible capacity, the high-rate charging/discharging characteristics, the cycle performances, and the like. The ratio (A/B) in the above-described flow particle image analysis is an index representing the feature of this small particle size portion, and is the index based on the number of particles. Therefore, the ratio can appropriately represent the feature of the small particle size portion. The A/B is a ratio of the frequency at the cumulative frequency of 20% from the smallest equivalent circle diameter to the frequency at the cumulative frequency of 80%, and it is increased as the proportion of fine particles having small diameters is increased.

The value of A/B is not specifically limited. However, a smaller value is preferable from the view point of the cell performance. It is favorable that the lower limit is 1.2 or more, preferably is 1.3 or more, more preferably is 1.4 or more, and further preferably is 1.5 or more from the view point of the cost of particle size adjustment and the yield in preparation of graphite particles. In particular, 1.6 or more is preferable. The upper limit is 8.0 or less, particularly is 7.0 or less, and further preferably is 6.0 or less.

As the A/B is increased, the irreversible capacity is increased, and the high-rate charging/discharging characteristics and the cycle performances of the cell deteriorate. The reason the high-rate charging/discharging characteristics and the cycle performances of the cell become favorable when the A/B is within the above-described range is not certain, but in consideration of the fact that the A/B exceeds the above-described range, it is estimated that the graphite particles contain large amounts of fine particles or binding between graphite particles with each other is weak and particles are broken by the ultrasonic irradiation in the measurement. In the former case, it is believed that the presence itself of the large amounts of fine particles increases the initial irreversible capacity and causes deterioration of the high-rate charging/discharging characteristics and the cycle performances of the cell. In the latter case, it is estimated that in a pressing step which is one of steps of working graphite particles into a nonaqueous secondary battery negative electrode, graphite particles present on the surface of the negative electrode are broken and block communicating holes serving as diffusion paths of lithium ions, so that the deterioration of the high-rate charging/discharging characteristics and the deterioration of the cycle performances are caused.

The number-basis equivalent circle diameter distribution for obtaining the A/B is measured based on the above-described flow particle image analysis.

d(002) and Lc(002)

With respect to the negative electrode material of the present invention, the value of d(002) based on the X-ray diffraction analysis is 0.3359 nm or less, preferably is 0.3356 nm or less, and 0.3354 nm, which is the value of highly crystalline graphite, or more is desirable. If the d(002) is too large, the crystallinity is inadequate to serve as graphite, and the charging/discharging capacity for serving as the negative electrode material is decreased. In addition, the strength of graphite particle is too high and, therefore, a high pressure is required when an active material layer applied to a current collector is press-molded so as to have a predetermined bulk density, so that it may be difficult to increase the density.

With respect to the negative electrode material of the present invention, it is desirable that the value of Lc(002), which is the thickness of crystal, based on the X-ray diffraction analysis is 80 nm or more, and preferably is 100 nm or more. In the case where the Lc(002) is less than 80 nm as well, the crystallinity is inadequate to serve as graphite, the charging/discharging capacity for serving as the negative electrode material is decreased. In addition, the strength of graphite particle is too high and, therefore, a high pressure is required when an active material layer applied to a current collector is press-molded so as to have a predetermined bulk density. Consequently, it may be difficult to increase the density.

(3) Method for Manufacturing Negative Electrode Material

The negative electrode material containing graphite particles as a main component is prepared by mixing raw materials, e.g., carbonaceous particles and binder, and if necessary, performing molding, firing for removing volatile matters, graphitization, pulverization, and classification.

Preferably, the carbonaceous particles in the raw materials for preparing the negative electrode material of the present invention satisfying the above-described properties have an average circularity of 0.84 or more. Preferably, this carbonaceous particles contain 1% or more of volatile matters.

Preferably, the graphite particles after graphitization are pulverized and, subsequently, fine powders are removed by an appropriate method through the use of an air classifier or the like.

When the pulverization is performed after graphitization, fine powders are hard to be generated.

A favorable method for manufacturing a negative electrode material of the present invention will be described below in detail.

Carbonaceous particles and a binder are mixed while being heated. At this time, a graphitization catalyst may be added, if desired. Favorable carbonaceous particles, binder, and graphitization catalyst are as described below.

Carbonaceous Particles

When pulverization products of those containing volatile matters (hereafter may be referred to as "VM") or heat-treatment products thereof are used as carbonaceous particles, which are the raw material and which are primary particles, the circularity tends to be increased, and the cycle performances, the liquid immersion property, and the like become favorable.

Preferably, the median diameter of the carbonaceous particles is 5 μm or more, most of all 6 μm or more, and particularly 8 μm or more, and 40 μm or less, most of all 35 μm or less, and particularly 30 μm or less in the volume-basis particle size distribution based on the laser diffraction/scattering particle size distribution measurement.

If the median diameter of the carbonaceous particles becomes lower than this lower limit, the cost required for pulverizing the carbonaceous particles is increased and there is no economy. If the median diameter exceeds the upper limit, the initial irreversible capacity of the graphite particles tends to be increased. The median diameter of the carbonaceous particles can be measured in a manner similar to that for the median diameter of the above-described negative electrode material.

Preferably, the average particle size of the carbonaceous particles to be used is smaller than the average particle size of the aimed graphite particles. Usually, the average particle size of the carbonaceous particles is less than or equal to twice, preferably less than or equal to the average particle size of the aimed graphite particles. The lower limit thereof is more than or equal to one-tenth, preferably more than or equal to one-fifth the average particle size of the aimed graphite particles.

The average circularity of the carbonaceous particles is within the range of 0.82 or more, preferably 0.90 or more, and is within the range of 1.00 or less, preferably 0.96 or less.

If the average circularity of the carbonaceous particles becomes lower than this lower limit, the orientation ratio of the graphite particles tends to be decreased. If the average circularity exceeds the upper limit, the cost of the carbonaceous particles themselves tends to be increased. The average circularity of the carbonaceous particles can be measured in a manner similar to that for the average circularity of the above-described negative electrode material.

Binder

Specific examples of binders include coal based heavy oils, e.g., impregnation pitch, coal tar pitch, and coal liquid; and petroleum based heavy oils, for example, straight heavy oils, e.g., asphaltene, and cracking heavy oils, e.g., ethylene heavy end tar.

In general, a quinoline-insoluble component contained in a binder is 0 to 10 percent by weight, and a smaller content is preferable from the view point of the hardness of the graphite particle and the capacity when a cell is prepared. If the content of quinoline-insoluble component in the binder is too large, the resulting graphite particles become hard, and even when an active material layer applied to the current collector is pressed, deformation of particles is hard to occur. Therefore, an increase of density tends to become difficult. In addition, the capacity is decreased.

The binder is used in such a way that the proportion of those derived from the binder becomes 5 percent by weight or more, and preferably 10 percent by weight or more in the graphite particle having been subjected to a graphitization treatment, produced by carbonization and graphitization. The upper limit thereof is the amount which leads the above-described proportion to usually 60 percent by weight or less, preferably 40 percent by weight or less, and further preferably 30 percent by weight or less. If the amount of binder is too large, the resulting graphite particles become hard and, therefore, even when an active material layer applied to the current collector is pressed, deformation of particles is hard to occur, and an increase of density tends to become difficult. It is preferable that the amount of binder is small and graphite granulated particles are not excessively hard, because round particles tend to be formed, and the particles are easy to pulverize.

The cell characteristics become favorable when the amount of binder becomes small. However, if the amount is too small, molding after kneading becomes difficult and, thereby, the manufacturing cost is increased. With respect to the graphite granulated particles, binding between graphite particles, which constitute the graphite granulated particles, with each other is weak, and in a pressing step which is one of steps of working the negative electrode material containing graphite particles as a main component into a plate for a negative electrode, since graphite particles present on the surface of the electrode tend to break, communicating holes serving as diffusion paths of lithium ions are blocked, and the high-rate charging/discharging characteristics deteriorates. For these reasons, the quick charging characteristic and, by extension, the cycle performances tend to become inadequate. Furthermore, fine-powdering of graphite particles tends to occur during handling, e.g., preparation of a coating solution.

The amount of binder in the negative electrode material is controlled by the amount of binder added in the stage before kneading. For example, in the case where the carbon residue of the binder determined by the method described in, for example, JIS K 2270 is X %, the binder in an amount 100/X times the desired amount is added.

Preferably, the binder, e.g., pitch or tar, is added while being dispersed uniformly at a low temperature for a short time as much as possible in order to reduce the initial irreversible capacity and reduce the press load. In order to ensure the low temperature and the short time, it is favorable to intensify agitation within the bounds of not breaking the carbonaceous particles.

Graphitization Catalyst

In order to increase the charging/discharging capacity and improve the pressing performance, preferably, a graphitization catalyst is added in the mixing of the carbonaceous particles and the binder. Examples of graphitization catalysts include metals, e.g., iron, nickel, titanium, silicon, and boron, and compounds, e.g., carbides, oxides, and nitrides, thereof. Most of all, silicon, silicon compounds, iron, and iron compounds are preferable. Among the silicon compounds, silicon carbide is particularly preferable, and among the iron compounds, iron oxides are particularly preferable.

In the case where silicon or a silicon compound is used as the graphitization catalyst, silicon carbide generated by heating is entirely heat-decomposed at a temperature of 2,800° C. or more, graphite having very good crystallinity is grown, and when silicon volatilizes, pores are formed between graphite crystals. Consequently, a charge transfer reaction and diffusion of lithium ions in the particles are facilitated, and the cell performance can be improved. In the case where iron or a compound thereof is used as the graphitization catalyst, graphite having good crystallinity is grown due to a mechanism of dissolution of carbon into the catalyst and deposition and, therefore, an effect similar to that of silicon can be exerted.

Kneading (Mixing)

Raw materials, e.g., carbonaceous particles, a binder, and a graphitization catalyst added as desired, are kneaded while being heated. In this manner, a state, in which the liquid binder is adhered to the carbonaceous particles and raw materials not melted at a kneading temperature, is brought about.

In this case, all raw materials may be charged into a kneader and kneading and temperature raising may be performed simultaneously. Alternatively, the components other than the binder may be charged into the kneader, and heated while being agitated. After the temperature is raised to the kneading temperature, the binder at ambient temperature or in the heat-molten state may be charged.

The heating temperature is higher than or equal to the softening point of the binder. If the heating temperature is too low, the viscosity of the binder is increased and uniform kneading becomes difficult. Therefore, usually, the heating temperature is specified to be at least 10° C. higher than the softening point, preferably at least 20° C. higher than the softening point. If the heating temperature is too high, the viscosity of the mixture system becomes too high due to volatilization and polycondensation of the binder. Therefore, the temperature is usually 300° C. or lower, and preferably 250° C. or lower.

Preferably, the kneader is a model having agitating blades, and common agitating blades of Z type or masticator type can be used. The amount of the raw material put into the kneader is usually 10 percent by volume or more of the kneader volume, preferably 15 percent by volume or more, and 50 percent by volume or less, preferably 30 percent by volume or less. The kneading time must be 5 minutes or more, and until the time, at which the viscosity begins changing significantly due to volatilization of the volatile matter, at the longest. The kneading time is usually 30 to 120 minutes. It is preferable that the kneader is preheated up to the kneading temperature prior to the kneading.

Molding

The resulting kneaded product, as it is, may be subjected to a firing step for removing VM for the purposes of removal of the volatile matter (VM) and carbonization. However, it is preferable that the kneaded product is subjected to a firing step for removing VM after molding is performed in order to facilitate the handling.

The molding method is not specifically limited insofar as the shape can be maintained, and extrusion, die molding, isostatic molding, or the like can be adopted. Among them, the die molding, in which the operation is relatively easy and a molded product can be obtained without breaking a structure allowed to exhibit a random orientation by the kneading, is preferable rather than extrusion in which particles tend to orient in the molded product and the isostatic molding, in which the random orientation of particles is maintained but the productivity is hard to increase.

With respect to the molding temperature, either room temperature (cold) or under heating (hot, a temperature higher than or equal to the softening point of the binder) is adopted. In the case where cold molding is performed, in order to improve the moldability and the uniformity of the molded product, it is desirable that the kneaded product cooled after the kneading is coarsely crushed to a size of 1 mm or less at the maximum in advance. The shape and the size of molded product is not specifically limited. However, in the hot molding, if the molded product is too large, there is a problem in that it takes much time to preheat uniformly prior to the molding. Therefore, the size is usually specified to be about 150 cm or less at the maximum size.

With respect to the molding pressure, if the pressure is too high, there are problems in that removal of volatilized matters (VM removal) through pores of the molded product becomes difficult and, in addition, carbonaceous particles, which are not perfect circles, are oriented so as to make pulverization in a downstream step difficult. Therefore, the upper limit of the molding pressure is usually 3 tf/cm$^2$ (294 Pa) or less, preferably 500 kgf/cm$^2$ (49 MPa) or less, and further preferably 10 kgf/cm$^2$ (0.98 MPa) or less. The lower limit of the pressure is not specifically limited, but it is preferable that the pressure is set at a level at which the shape of the molded product can be maintained during the step of VM removal.

Firing for VM Removal

The resulting molded product is subjected to firing for VM removal in order to remove volatile matters (VM) in the carbonaceous particles and the binder and prevent contamination of a filler and adhesion of the filler to the molded product during graphitization. The firing for VM removal is performed at a temperature of usually 500° C. or higher, preferably 600° C. or higher, and usually 1,700° C. or lower, preferably 1,400° C. or lower for usually 0.1 to 10 hours. In general, heating is performed while flowing an inert gas, e.g., nitrogen or argon, or in a non-oxidizing atmosphere in which granular carbon materials, e.g., breeze and packing coke, are filled in gaps in order to prevent oxidation.

The equipment, e.g., an electric furnace, a gas furnace, or a lead hammer furnace for an electrode material, to be used for the firing for VM removal is not specifically limited insofar as firing can be performed in a non-oxidizing atmosphere. It is desirable that the temperature raising rate during heating is low in order to remove the volatile matters. In general, the temperature is raised at a rate of 3° C. to 100° C./hr from the neighborhood of 200° C., at which volatilization of the low boiling point component is started, to the neighborhood of 700° C., at which merely hydrogen is generated.

Graphitization

The carbonized molded product resulting from the firing for VM removal is graphitized by being hearted at a high temperature. As the heating temperature during graphitization becomes lower, graphitization does not proceed. Consequently, the A/B of the resulting negative electrode material is decreased, whereas the graphite particles become hard, and there is a tendency that a high pressure is required when the active material layer applied to the current collector is press-molded so as to have a predetermined bulk density and an increase of density becomes difficult. Therefore, the heating is performed usually at 2,900° C. or higher, and preferably at 3,000° C. or higher. If the heating temperature is too high, sublimation of graphite becomes significant. Therefore, 3,300° C. or lower is preferable. The heating is necessary until the binder and the carbonaceous particles are converted to graphite and, therefore, the heating time is usually 1 to 24 hours.

With respect to an atmosphere during the graphitization, for the purpose of preventing oxidation, the graphitization is performed while flowing an inert gas, e.g., nitrogen or argon, or in a non-oxidizing atmosphere in which granular carbon materials, e.g., breeze and packing coke, are filled in gaps.

The equipment, e.g., an electric furnace, a gas furnace, or an Acheson furnace for an electrode material, to be used for the graphitization is not specifically limited insofar as the equipment serves the above-described purpose. The temperature raising rate, the cooling rate, the heat treatment time, and the like can be set arbitrarily within the allowable range of the equipment to be used.

Pulverization

In general, the thus prepared graphitization treatment product, which has been subjected to no further treatment, does not have a particle size distribution specified in the present invention. Therefore, an adjustment is performed to have a predetermined particle size distribution by pulverization, sieving, or the like.

The method for pulverizing the graphitization treatment product is not specifically limited. Examples of pulverization devices include mechanical trituration devices, e.g., a ball mill, a hammer mill, a CF mill, an atomizer mill, and a pulverizer; and pulverization devices through the use of wind force, e.g., a jet mill. With respect to coarse crushing and medium crushing, crushing systems, e.g., a jaw crusher, a hammer mill, and a roller mill, through the use of an impact force may be used.

Here, the timing of pulverization is either before the graphitization or after the graphitization. The latter is more preferable because operations, e.g., packing into a crucible, are unnecessary and, therefore, the production can be performed inexpensively.

Classification

Large diameter particles and small diameter particles (fine powder) are removed from the resulting pulverized product in such a way that the $d_{90}/d_{10}$ and the A/B become within the above-described range. An occurrence of short circuit can be prevented and variations during coating can be eliminated by removing large diameter particles. It is desirable that grading is performed in such a way that particles having a particle size of 100 µm or more becomes 3% or less relative to the entirety and particles having a particle size of 1 µm or less becomes 1% or less relative to the entirety in the volume-basis particle size distribution based on the laser diffraction/scattering particle size measurement by removing large diameter particles and fine powders.

There are various methods for removing large diameter particles and small diameter particles. However, it is preferable that the removal is performed by sieving or classification from the view point of the simplicity of apparatuses, the operability, and the cost. Furthermore, the sieving or the classification have advantages that the particle size distribution and the average particle size, which are varied by the following graphitization and removal of the above-described particles, of the granulated product can be readjusted, if necessary.

Examples of the sieving for removing large diameter particles include fixed net face type, in-plane movement type, and rotary sieve type. However, the fixed net face type blow through sieve is particularly preferable from the view point of the handling capacity. The size of opening of the sieve to be used is 80 µm or less, and 30µ or more, and is appropriately selected for the use in accordance with the generation status (in particular, the amount and the particle size) of particles to be removed and the requirements for adjusting the particle size distribution and the average particle size of the granulated product. If the size of opening exceeds 80 µm, the removal of the particles becomes inadequate. If the size is less than 30 µm, the granulated product may be removed excessively, so that, unfavorably, a large product loss occurs and, in addition, the adjustment of the particle size distribution becomes difficult. Commercially available common size sieves having openings of 45 µm and 38 µm can be used favorably.

Classification can be performed by a method based on wind force classification, wet classification, specific gravity classification, or the like. When particles of 100 µm or more are removed, although not specifically limited, it is preferable to use the wind force classifier, e.g., a swirling flow classifier, in consideration of the influence on the properties of granulated product and adjustment of the particle size distribution and the average particle size of granulated product. In this case, when the amount of wind and the speed of wind are controlled, the removal of the particles and the adjustment of the particle size distribution and the average particle size of granulated product can be performed in a manner similar to that in the above-described adjustment of the size of opening of the sieve.

[2] Negative Electrode for Nonaqueous Secondary Battery

The negative electrode material of the present invention is suitable for the use as a negative electrode active material of a nonaqueous secondary battery, in particular, a lithium secondary battery.

A negative electrode constituting a nonaqueous secondary battery is produced by forming an active material layer containing a negative electrode active material, a binder for forming an electrode, a thickener, and if necessary, an electrically conductive material on a current collector. In general, the active material layer is produced by preparing a slurry containing a negative electrode active material, a binder for forming an electrode, a thickener, if necessary an electrically conductive material, and a solvent, and applying the slurry to the current collector, followed by drying and pressing.

With respect to the negative electrode active material, a material usually used as a negative electrode active material may also be used in addition to the negative electrode materials of the present invention.

With respect to the binder for forming an electrode, an arbitrary material can be used insofar as the material is stable against a solvent and an electrolytic solution to be used in preparation of the electrode. Examples thereof include polyvinylidene fluoride, polytetrafluoroethylene, polyethylene, polypropylene, styrene-butadiene rubber, isoprene rubber, butadiene rubber, ethylene-acrylic acid copolymer, and ethylene-methacrylic acid copolymer. The binder for forming an electrode is used within the range satisfying the weight ratio of active material/binder for forming electrode of usually 90/10 or more, preferably 95/5 or more, and usually 99.9/0.1 or less, preferably 99.5/0.5 or less.

Examples of thickeners include carboxymethyl cellulose, methyl cellulose, hydroxymethyl cellulose, ethyl cellulose, polyvinyl alcohol, oxidized starch, phosphorylated starch, and casein.

Examples of electrically conductive materials include carbon materials, e.g., graphite and carbon black; and metal materials, e.g., copper and nickel.

Examples of materials for the current collector include copper, nickel, and stainless steel. Among them, copper foil is preferable from the view point of the workability into a thin film and the cost.

The gravity of the active material layer is varied depending on the use. In the use in which the capacity is important, the density is usually 1.55 g/cm$^3$ or more, preferably 1.60 g/cm$^3$ or more, further preferably 1.65 g/cm$^3$ or more, and particularly preferably 1.70 g/cm$^3$ or more. If the density is too low, the capacity of the cell per unit volume is not always adequate. If the density is too high, the Rate performances deteriorates. Therefore, 1.9 g/cm$^3$ or less is preferable.

The active material layer refers to a mixture layer composed of an active material, a binder for forming an electrode, a thickener, an electrically conductive material, and the like on the current collector, and the density thereof refers to a bulk density at the time of assembling into a cell.

[3] Nonaqueous Secondary Battery

The negative electrode for a nonaqueous secondary battery of the present invention prepared by using the negative electrode material of the present invention is very useful as a negative electrode for a nonaqueous secondary battery, in particular, a lithium secondary battery.

Selection of a positive electrode, an electrolytic solution, and the like, which are components necessary for constituting a cell, constituting the above-described nonaqueous secondary battery is not specifically limited. Examples of materials and the like for the components constituting the nonaqueous secondary battery will be described below. However, usable materials are not limited to these specific examples.

The nonaqueous secondary battery of the present invention is usually composed of the above-described negative electrode of the present invention, a positive electrode, and an electrolyte.

The positive electrode is produced by forming an active material layer containing a positive electrode active material, an electrically conductive material, and a binder for forming an electrode on a positive electrode current collector. In general, the active material layer is produced by preparing a slurry containing the positive electrode active material, the electrically conductive material, and the binder for forming an electrode, and applying the slurry to the current collector, followed by drying.

Examples of materials usable as the positive electrode active material include materials capable of absorbing and releasing lithium, such as lithium transition metal compound oxide materials, e.g., lithium cobalt oxide, lithium nickel oxide, and lithium manganese oxide; transition metal oxide materials, e.g., manganese dioxide; and carbonaceous materials, e.g., graphite fluoride. Specifically, $LiFeO_2$, $LiCoO_2$, $LiNiO_2$, $LiMn_2O_4$, non-stoichiometric compounds thereof, $MnO_2$, $TiS_2$, $FeS_2$, $Nb_3S_4$, $MO_3S_4$, $CoS_2$, $V_2O_5$, $P_2O_5$, $CrO_3$, $V_3O_3$, $TeO_2$, $GeO_2$, and the like can be used.

With respect to the positive electrode current collector, preferably, a metal, which forms a passive film on a surface due to anodization in the electrolytic solution, or an alloy thereof is used. Examples thereof can include groups IIIa, IVa, and Va (groups 3B, 4B, and 5B) metals and alloys thereof. Specific examples can include Al, Ti, Zr, Hf, Nb, Ta, and alloys containing these metals. Preferably, Al, Ti, Ta, and alloys containing these metals can be used. In particular, Al and alloys thereof are desirable because they are lightweight and, therefore, the energy density is high.

Examples of electrolytes can include an electrolytic solution, a solid electrolyte, and a gel electrolyte. Most of all, the electrolytic solution, in particular, a nonaqueous electrolytic solution is preferable. For the nonaqueous electrolytic solution, a solution, in which a solute is dissolved into a nonaqueous solvent, can be used.

For the solute, alkali metal salts, quaternary ammonium salts, and the like can be used. Specifically, it is preferable that at least one compound selected from the group consisting of $LiClO_4$, $LiPF_6$, $LiBF_4$, $LiCF_3SO_3$, $LiN(CF_3SO_2)_2$, $LiN(CF_3CF_2SO_2)_2$, $LiN(CF_3SO_2)(C_4F_9SO_2)$, an $LiC(CF_3SO_2)_3$ is used.

Examples of solvents usable as the nonaqueous solvent include cyclic carbonates, e.g., ethylene carbonate, butylene carbonate, and vinylene carbonate; cyclic ester compounds, e.g., γ-butyrolactone; chain ethers, e.g., 1,2-dimethoxyethane; cyclic ethers, e.g., crown ether, 2-methyltetrahydrofuran, 1,2-dimethyltetrahydrofuran, 1,3-dioxolane, and tetrahydrofuran; and chain carbonates, e.g., diethyl carbonate, ethyl methyl carbonate, and dimethyl carbonate. With respect to each of the solute and the solvent, one type may be selected and used, or at least two types may be mixed and used. Among them, it is preferable that the nonaqueous solvent contains the cyclic carbonate and the chain carbonate.

preferably, the content of these solutes in the electrolytic solution is 0.2 mol/l or more, particularly 0.5 mol/l or more, and 2 mol/l or less, particularly 1.5 mol/l or less.

Among them, a nonaqueous secondary battery formed by combining the negative electrode according to the present invention, a metal chalcogenide based positive electrode commonly used for a lithium ion cell, and an organic electrolytic solution mainly containing a carbonate based solvent has a large capacity, a small irreversible capacity observed in an initial cycle, a high quick charging/discharging capacity (good Rate performances), an excellent cycle performances, high storage stability and reliability of a cell stood at high temperatures, a high-efficiency discharge characteristic, and very excellent discharge characteristic at low temperatures.

The nonaqueous electrolytic solution may contain a film-former. Examples of film-formers include carbonate compounds, e.g., vinylene carbonate, vinyl ethyl carbonate, and methyl phenyl carbonate; alkene sulfides, e.g., ethylene sulfide and propylene sulfide; sulton compounds, e.g., 1,3-propane sulton and 1,4-butane sulton; and acid anhydrides, e.g., maleic anhydride and succinic anhydride. The content of the film-former is usually 10 percent by weight or less, preferably 8 percent by weight or less, further preferably 5 percent by weight or less, and most preferably 2 percent by weight or less. If the content of the film-former is too large, adverse effects, e.g., an increase of the initial irreversible capacity, deterioration of the low temperature characteristic, and deterioration of the Rate performances, may be exerted with respect to the other characteristics.

In general, a separator is disposed between the positive electrode and the negative electrode in order to avoid physical contact between the positive electrode and the negative electrode. Preferably, the separator has high ion permeability and a low electric resistance. The material and the shape of the separator are not specifically limited, but it is preferable that high stability is exerted against the electrolytic solution, and excellent solution preserving property is exhibited. Specific Examples thereof include porous sheets and nonwoven fabrics derived from a polyolefin, e.g., polyethylene or polypropylene.

The shape of the nonaqueous secondary battery of the present invention is not specifically limited. Examples thereof include a cylinder type in which sheet electrodes and a separator are made into a spiral shape, a cylinder type having an inside out structure in which pellet electrodes and a separator are combined, and a coin type in which pellet electrodes and a separator are laminated.

EXAMPLES

The specific aspects of the present invention will be described below in further detail with reference to the examples. However, the present invention is not limited to these examples.

Example 1

An amorphous carbon material containing 6 percent by weight of volatile matter was subjected to coarse crushing, and was further pulverized with a fine grinding mill ("Sample Mill" produced by Hosokawa Micron Corporation). Coarse particles were removed with a sieve having an opening of 15 μm and, furthermore, a heat treatment was performed at 700° C. for 30 minutes, so that carbonaceous particles having a median diameter of 9.7 μm, a minimum particle size of 1.0 μm, a maximum particle size of 29.9 μm, and an average circularity of 0.88 were produced.

The resulting carbonaceous particles and a binder pitch having a softening point of 88° C. were mixed in a weight ratio of 100:34, and 8 parts by weight of graphitization catalyst ($Fe_2O_3$) was added relative to 100 parts by weight of the mixture. The resulting mixture was put into a kneader having a masticator type agitating blade heated to 128° C. in advance and kneading was performed for 20 minutes.

The kneaded product, which had been kneaded adequately, was filled in a mold of a mold pressing machine preheated to 108° C. in advance, and was stood for 5 minutes. After the temperature of the kneaded product was stabilized, a plunger was pushed, and molding was performed by applying a pressure of 2 kgf/cm$^2$ (0.20 MPa). This pressure was maintained for 1 minute, and the movement was stopped. After the pressure reduction was completed, a molded product having a diameter of 6 cm and a length of 9 cm was taken out.

The resulting molded product was put into a metal saggar, which was a heat-resistant container, and gaps were filled with graphite breeze. The temperature was raised from room temperature to 1,000° C. over 48 hours in an electric furnace, and was kept at 1,000° C. for 3 hours, so that the firing for removing VM was performed. Subsequently, the molded product was put into a graphite crucible, and gaps were filled with graphite breeze. Graphitization was performed by heating in an Acheson furnace at 3,000° C. for 4 hours.

The resulting graphite molded product was coarsely crushed with a jaw crusher, and was pulverized with Sample Mill. Coarse particles were removed with a sieve having an opening of 45 μm and, furthermore, grading was performed by removing 5% of fine particles through wind force classification ("*NPK-MC-MDS-2" produced by Nippon Pneumatic Mfg. Co., Ltd., was used, a spacer thickness was 4 mm, the number of revolutions of a feeder was 500 rpm, and evacuation was performed at a reduced pressure of 540 mmH$_2$O while an appropriate amount of air was fed), so that graphite particles having a median diameter of 18.3 μm were produced.

The resulting graphite particles had a tapping density of 0.92 g/cm$^3$, a BET specific surface area of 2.2 m$^2$/g, an average circularity of 0.85, the total number of particles of 20.4×10$^6$/g, the $d_{90}/d_{10}$ of 4.7, the A/B of 1.6, the d(002) of 0.3359 nm, and Lc(002) of 136 nm.

These graphite particles were used as the negative electrode material, and a coin type cell was prepared by the following method. The initial charging/discharging capacity, the initial charge irreversible capacity, and the Rate performances were determined. The predetermined electrode of the present invention was prepared by the above-described predetermined method for manufacturing an electrode, and the graphite crystal orientation ratio ($I_{110}/I_{004}$) on the electrode was measured. Furthermore, the resulting predetermined electrode was used, and a laminate film inclusion type cell was prepared by the above-described method for manufacturing a nonaqueous secondary battery. Subsequently, the capacity maintenance factor after 200 cycles of charging and discharging was measured by the above-described method.

The results thereof are shown in Table 1.

<Preparation of Coin Type Cell>

A slurry was produced by adjusting 10 g of the negative electrode material, 0.1 g of carboxymethyl cellulose aqueous solution in terms of solid content, and 0.1 g of styrene-butadiene rubber aqueous dispersion in terms of solid content in such a way that the solid concentration becomes 50% and agitating for 3 minutes with a hybrid mixer produced by KEYENCE CORPORATION. The resulting slurry was applied to the copper foil serving as a current collector by a doctor blade method in such a way that 10±0.1 mg/cm$^2$ of negative electrode material is adhered, and air drying was performed at room temperature. Furthermore, drying was performed at 110° C. for 30 minutes and, thereafter, the electrode density was adjusted at 1.6±0.03 g/cm$^3$ by pressing, so that a negative electrode sheet was produced.

The resulting negative electrode sheet was stamped into the shape of a disk having a diameter of 12.5 mm so as to produce a negative electrode, and lithium metal foil was stamped into the shape of a disk having a diameter of 12.5 mm so as to produce a positive electrode. A separator (formed from a porous polyethylene film) impregnated with an electrolytic solution, in which LiPF$_6$ was dissolved in a mixed solvent of ethylene carbonate and ethyl methyl carbonate (volume ratio=1:1) in such a way that the concentration became 1 mol/l, was disposed between the negative electrode and the positive electrode so as to prepare a 2016 coin type cell.

<Initial Charging/Discharging Capacity, Initial Charge Irreversible Capacity>

The resulting 2016 coin type cell was stood for 24 hours, charging was performed at a current density of 0.16 mA/cm$^2$ until the potential difference between the two electrodes became 0 V and, thereafter, discharging was performed at 0.33 mA/cm$^2$ until the potential difference became 1.5 V. A reference charging/discharging test was carried out, and an average value of discharge capacities at the first cycle was taken as the initial charging/discharging capacity. The irreversible capacity (initial charge capacity—initial discharge capacity) occurred at the first cycle was taken as the initial charge irreversible capacity. The initial discharge capacity and the initial charge irreversible capacity of each of three coin type cells were measured and the average values were determined.

<Rate Performances>

The resulting 2016 coin type cell was charged at a current density of 0.16 mA/cm$^2$ until the potential difference between the two electrodes became 0 V and, thereafter, discharging was performed at 7.0 mA/cm$^2$ until the potential difference became 1.5 V. The discharge capacity at this time was divided by the discharge capacity when discharge was performed at 0.7 mA/cm$^2$, and the resulting value was expressed as a percentage (Rate performances). The Rate performances of each of three coin type cells was determined and the average value was obtained.

Example 2

Natural graphite having a median diameter of 17.2 μm, a minimum particle size of 7.7 μm, a maximum particle size of 67.5 μm, and an average circularity of 0.95 and a binder pitch having a softening point of 88° C. were mixed in a weight ratio of 100:34. The resulting mixture was put into a kneader having a masticator type agitating blade heated to 128° C. in advance and kneading was performed for 20 minutes.

The kneaded product, which had been kneaded adequately, was filled in a mold of a mold pressing machine preheated to 108° C. in advance, and was stood for 5 minutes. After the temperature of the kneaded product was stabilized, a plunger was pushed, and molding was performed by applying a pressure of 5 kgf/cm$^2$ (0.20 MPa). This pressure was maintained for 1 minute, and the movement was stopped. After the pressure reduction was completed, a molded product was taken out.

The resulting molded product was put into a metal saggar, which was a heat-resistant container, and gaps were filled with graphite breeze. The temperature was raised from room temperature to 1,300° C. over 48 hours in an electric furnace, and was kept at 1,300° C. for 3 hours, so that the firing for removing VM was performed. Subsequently, the molded product was put into a graphite crucible, and gaps were filled with graphite breeze. Graphitization was performed by heating in an Acheson furnace at 3,000° C. for 4 hours.

The resulting graphite molded product was coarsely crushed with a jaw crusher, and was pulverized with a high speed rotation mill. Coarse particles were removed with a sieve having an opening of 45 μm, so that graphite particles having a median diameter of 18.6 μm were produced. The resulting graphite particles had a tapping density of 1.26 g/cm$^3$, a BET specific surface area of 1.6 m$^2$/g, an average circularity of 0.93, the total number of particles of 9.0×10$^6$/g, the $d_{90}/d_{10}$ of 2.2, the A/B of 0.80, the d(002) of 0.3354 nm, and Lc(002) of more than 1,000 nm.

These graphite particles were used as the negative electrode material, and a coin type cell was prepared as in Example 1. The initial charging/discharging capacity, the initial charge irreversible capacity, and the Rate performances were determined. The predetermined electrode of the present invention was prepared similarly. The graphite crystal orientation ratio ($I_{110}/I_{004}$) on the electrode and the capacity maintenance factor after 200 cycles of charging and discharging were measured. The results thereof are shown in Tables 1 and 2.

Comparative Example 1

An amorphous carbon material containing less than 0.1 percent by weight of volatile matter was subjected to coarse crushing, and was further pulverized with a fine grinding mill ("Sample Mill" produced by Hosokawa Micron Corporation) Coarse particles were removed with a sieve having an opening of 45 μm, so that carbonaceous particles having a median diameter of 9.0 μm, a minimum particle size of 0.6 μm, a maximum particle size of 51.5 μm, and an average circularity of 0.80 were produced.

These carbonaceous particles were used. In a manner similar to that in Example 1, mixing of a binder and a graphitization catalyst, molding, removal of VM, graphitization, pulverization, and grading were performed, so that graphite particles having a median diameter of 20.5 μm were produced.

The resulting graphite particles had a tapping density of 0.79 g/cm$^3$, a BET specific surface area of 2.9 m$^2$/g, an average circularity of 0.82, the total number of particles of 21.0×10$^6$/g, the $d_{90}/d_{10}$ of 3.7, the A/B of 1.6, the d(002) of 0.3357 nm, and Lc(002) of 187 nm.

These graphite particles were used as the negative electrode material, and a coin type cell was prepared as in Example 1. The initial charging/discharging capacity, the initial charge irreversible capacity, and the Rate performances were determined. The predetermined electrode of the present invention was prepared similarly. The graphite crystal orientation ratio ($I_{110}/I_{004}$) on the electrode and the capacity maintenance factor after 200 cycles of charging and discharging were measured. The results thereof are shown in Tables 1 and 2.

Comparative Example 2

An amorphous carbon material containing 0.1 percent by weight or less of volatile matter was subjected to coarse crushing, and was further pulverized with a fine grinding mill ("Sample Mill" produced by Hosokawa Micron Corporation). Coarse particles were removed with a sieve having an opening of 45 μm, so that carbonaceous particles having a median diameter of 9.0 μm, a minimum particle size of 0.6 μm, a maximum particle size of 51.5 μm, and an average circularity of 0.80 were produced.

The resulting carbonaceous particles and a binder pitch having a softening point of 88° C. were mixed in a weight ratio of 100:34, and 50 parts by weight of graphitization catalyst (silicon carbide) was added relative to 100 parts by weight of the carbonaceous particles. The resulting mixture was put into a kneader having a masticator type agitating blade heated to 128° C. in advance and kneading was performed for 20 minutes. In a manner similar to that in Example 1, molding, removal of VM, graphitization, pulverization, and grading were performed, so that graphite particles having a median diameter of 16.7 μm were produced. The resulting graphite particles had a tapping density of 0.77 g/cm$^3$, a BET specific surface area of 4.7 m$^2$/g, an average circularity of 0.87, the total number of particles of 18.5×10$^6$/g, the $d_{90}/d_{10}$ of 3.0, the A/B of 1.2, the d(002) of 0.3356 nm, and Lc(002) of 217 nm.

These graphite particles were used as the negative electrode material, and a coin type cell was prepared as in Example 1. The initial charging/discharging capacity, the initial charge irreversible capacity, and the Rate performances were determined. The predetermined electrode of the present invention was prepared similarly. The graphite crystal orientation ratio ($I_{110}/I_{004}$) on the electrode and the capacity maintenance factor after 200 cycles of charging and discharging were measured. The results thereof are shown in Tables 1 and 2.

TABLE 1

| | Carbonaceous particles (raw material primary particles) | | Negative electrode material | | | | | | | | |
|---|---|---|---|---|---|---|---|---|---|---|---|
| | Median diameter (μm) | Average circularity | Median diameter (μm) | Tapping density (g/cm3) | BET specific surface area (m$^2$/g) | Average circularity | The total number of particles (×10$^6$/g) | $d_{90}/d_{10}$ | A/B | d(002) (nm) | Lc(002) (nm) |
| Example 1 | 9.7 | 0.88 | 18.3 | 0.92 | 2.2 | 0.85 | 20.4 | 4.7 | 1.6 | 0.3359 | 136 |
| Example 2 | 17.2 | 0.95 | 18.6 | 1.26 | 1.6 | 0.93 | 9.0 | 2.2 | 0.8 | 0.3354 | >1000 |
| Comparative example 1 | 9.0 | 0.80 | 20.5 | 0.79 | 2.9 | 0.82 | 21.0 | 3.7 | 1.6 | 0.3357 | 187 |
| Comparative example 2 | — | — | 16.7 | 0.77 | 4.7 | 0.87 | 18.5 | 3.0 | 1.2 | 0.3356 | 217 |

TABLE 2

| | Electrode evaluation | Coin type cell | | | Laminate film inclusion type cell |
|---|---|---|---|---|---|
| | Crystal orientation ratio ($I_{110}/I_{004}$) | Discharge capacity (mAh/g) | Irreversible capacity (mAh/g) | Rate performances (%) | 200-cycle capacity maintenance factor (%) |
| Example 1 | 0.10 | 348 | 31 | 86 | 82 |
| Example 2 | 0.11 | 360 | 27 | 85 | 84 |

TABLE 2-continued

|  | Electrode evaluation | Coin type cell | | | Laminate film inclusion type cell |
| --- | --- | --- | --- | --- | --- |
|  | Crystal orientation ratio ($I_{110}/I_{004}$) | Discharge capacity (mAh/g) | Irreversible capacity (mAh/g) | Rate performances (%) | 200-cycle capacity maintenance factor (%) |
| Comparative example 1 | 0.02 | 349 | 32 | 80 | 76 |
| Comparative example 2 | 0.06 | 350 | 32 | 78 | 69 |

As is clear from Tables 1 and 2, the cell including the negative electrode material of the present invention has a small charging/discharging irreversible capacity at an initial cycle and exhibits excellent high-rate charging/discharging characteristics and excellent cycle performances.

INDUSTRIAL APPLICABILITY

By using the negative electrode material of the present invention, a negative electrode for a nonaqueous secondary battery having a small charging/discharging irreversible capacity at an initial cycle and exhibiting excellent high-rate charging/discharging characteristics and excellent cycle performances when a nonaqueous secondary battery is produced and a nonaqueous secondary battery can be prepared stably and efficiently. Therefore, the present invention is industrially very useful in the field of various nonaqueous secondary batteries.

The present invention has been described in detail with reference to specific aspects. However, it is clear for those skilled in the art that various modifications can be made within the spirit and scope of the present invention.

This application is based on Japanese patent application (Japanese Patent Application No. 2004-250415) filed on Aug. 30, 2004, the entire contents of which are incorporated herein by reference.

The invention claimed is:

1. A negative electrode material for a nonaqueous secondary battery, comprising:
    as the main component, graphite particles having a median diameter of from 5 μm to 40 μm in the volume-basis particle size distribution based on the laser diffraction/scattering particle size distribution measurement;
    a tapping density of 0.7 g/cm$^3$ or more;
    a specific surface area measured by a BET method of from 0.2 m$^2$/g, to 8 m$^2$/g;
    an average circularity of the graphite particles of from 0.83 to 1.00; and
    when an electrode is produced by a method for manufacturing an electrode and the resulting electrode is subjected to X-ray diffraction, the graphite crystal orientation ratio $I_{110}/I_{004}$ on the electrode is 0.08 or more, where $I_{110}$ represents the wide angle X-ray diffraction peak area of the (110) peak in the region of 2θ=76.5 to 78.5 degrees of the graphite particles on the electrode and $I_{004}$ represents the wide angle X-ray diffraction peak area of the (004) peak in the region of 2θ=53.5 to 56 degrees, said method for manufacturing an electrode comprising:
    adding 1 part by weight of aqueous dispersion of styrene-butadiene rubber in terms of solid content and 1 part by weight of carboxymethyl cellulose having a molecular weight of from 250,000 to 300,000 present in an aqueous solution in terms of solid content to 100 parts by weight of the negative electrode material to form a slurry,
    applying said slurry to a current collector formed from copper foil having a thickness of 18 μm by using a doctor blade in such a way that 10±0.1 mg/cm$^2$ of the negative electrode material in terms of weight after drying is adhered, followed by drying, and
    pressing once with a roll press while a press load is adjusted in such a way that the electrode density, exclusive of the copper foil, becomes 1.63±0.03 g/cm$^3$.

2. The negative electrode material according to claim 1, wherein the negative electrode material comprises graphite granulated particles, in which a plurality of graphite particles are bonded to each other, as a main component.

3. The negative electrode material according to claim 1, wherein the total number of graphite particles is 30×10$^6$/g or less, determined by a number-basis equivalent circle diameter distribution measurement based on the flow particle image analysis with a lower limit of detection of 0.6 μm.

4. The negative electrode material according to claim 1, wherein the negative electrode material is produced from carbonaceous primary particles, as a raw material, having a median diameter of from 5 μm to 40 μm in the volume-basis particle size distribution based on the laser diffraction/scattering particle size distribution measurement.

5. The negative electrode material according to claim 1, wherein the negative electrode material is produced from carbonaceous primary particles, as a raw material, having an average circularity of from 0.82 to 1.00.

6. The negative electrode material according to claim 1, wherein said median diameter of said graphite particles is from 10 μm to 30 μm.

7. The negative electrode material according to claim 1, wherein said tapping density is from 0.9 g/cm$^3$ to 1.3 g/cm$^3$.

8. The negative electrode material according to claim 1, wherein said specific surface area is from 0.3 m$^2$/g to 4 m$^2$/g.

9. The negative electrode material according to claim 1, wherein said average circularity is from 0.90 to 0.96.

10. The negative electrode material according to claim 1, wherein said graphite crystal orientation ratio $I_{110}/I_{004}$ on the electrode is from 0.08 to 0.20.

11. The negative electrode material according to claim 1, wherein said graphite crystal orientation ratio $I_{110}/I_{004}$ on the electrode is from 0.09 to 0.18.

12. The negative electrode material according to claim 1, wherein said graphite crystal orientation ratio $I_{110}/I_{004}$ on the electrode is from 0.10 to 0.16.

13. A negative electrode for a nonaqueous secondary battery, comprising a negative electrode active material layer, which comprises the negative electrode material according to claim 1 as an active material, wherein said negative electrode active material is present on a current collector.

14. A nonaqueous secondary battery comprising
a positive electrode capable of absorbing and emitting lithium ions,
the negative electrode according to claim 13, which is capable of absorbing and emitting lithium ions, and
an electrolyte.

15. The nonaqueous secondary battery according to claim 14, exhibiting an irreversible capacity of at most 31 mAh/g.

16. The nonaqueous secondary battery according to claim 14, exhibiting a rate performance of at least 85%.

* * * * *